(12) United States Patent
Miyauchi (10) Patent No.: US 11,385,419 B2
(45) Date of Patent: Jul. 12, 2022

(54) DISPLAY APPARATUS

(71) Applicant: SHARP KABUSHIKI KAISHA, Osaka (JP)

(72) Inventor: Kohji Miyauchi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/225,750

(22) Filed: Apr. 8, 2021

(65) Prior Publication Data
US 2022/0011527 A1   Jan. 13, 2022

(30) Foreign Application Priority Data
Jul. 8, 2020   (JP) .............................. JP2020-117984

(51) Int. Cl.
*H04B 10/00* (2013.01)
*G02B 6/42* (2006.01)
*G08C 23/04* (2006.01)

(52) U.S. Cl.
CPC .......... *G02B 6/4202* (2013.01); *G02B 6/4245* (2013.01); *G02B 6/4292* (2013.01); *G08C 23/04* (2013.01)

(58) Field of Classification Search
None
See application file for complete search history.

(56) References Cited

U.S. PATENT DOCUMENTS

| | | | | |
|---|---|---|---|---|
| 5,218,466 A * | 6/1993 | Brooks | ................. | H04B 10/11 398/116 |
| 5,477,275 A * | 12/1995 | Toyoshima | ............ | H04N 21/47 348/554 |
| 5,530,578 A * | 6/1996 | Takemoto | ............... | H04B 10/40 398/129 |
| 5,570,220 A * | 10/1996 | Matsumoto | .......... | H04B 10/114 348/343 |
| 5,726,645 A * | 3/1998 | Kamon | .................. | H04B 1/202 340/12.28 |
| 5,815,297 A * | 9/1998 | Ciciora | ................ | H04B 10/114 340/12.53 |
| 5,894,278 A * | 4/1999 | Kubo | ..................... | G08C 23/04 340/12.52 |
| 5,903,374 A * | 5/1999 | Kobayashi | ......... | H04B 10/1143 398/131 |
| 5,953,145 A * | 9/1999 | Koyama | ........... | H01L 31/02325 398/156 |
| 6,005,700 A * | 12/1999 | Pressler | ............... | G02B 6/0008 235/492 |
| 6,115,161 A * | 9/2000 | Cho | ...................... | G06F 1/1616 398/129 |
| 6,128,117 A * | 10/2000 | Kim | ..................... | H04B 10/801 398/115 |

(Continued)

FOREIGN PATENT DOCUMENTS

JP   2014-68163 A   4/2014

*Primary Examiner* — Agustin Bello
(74) *Attorney, Agent, or Firm* — ScienBiziP, P.C.

(57) ABSTRACT

A light receiving unit is disposed so as not to protrude from a lower side surface of a display apparatus. The light receiving unit receives infrared light. A light guide unit guides the infrared light to the light receiving unit. The light guide unit is mounted on the lower side surface of the display apparatus in a demountable manner.

8 Claims, 7 Drawing Sheets

(56) References Cited

U.S. PATENT DOCUMENTS

| | | | |
|---|---|---|---|
| 6,264,376 B1 * | 7/2001 | Savage, Jr. | G02B 6/4219 385/33 |
| 6,313,880 B1 * | 11/2001 | Smyers | H04N 21/4122 348/552 |
| 6,486,994 B1 * | 11/2002 | Giles | H04B 10/114 398/117 |
| 6,501,581 B1 * | 12/2002 | Snyder | H04B 10/25 398/129 |
| 6,724,442 B1 * | 4/2004 | Zyskowski | H04N 21/42204 348/734 |
| 6,769,129 B1 * | 7/2004 | Perlman | H04N 5/4403 725/80 |
| 6,927,760 B2 * | 8/2005 | Chin | G06F 3/0221 341/22 |
| 6,962,448 B2 * | 11/2005 | Kelsay | G01B 11/00 385/33 |
| 6,967,835 B2 * | 11/2005 | Chiang | G06F 3/0202 361/679.08 |
| 7,023,498 B2 * | 4/2006 | Ishihara | G10L 15/26 348/734 |
| 7,039,326 B1 * | 5/2006 | Chung | H04B 10/1121 250/208.2 |
| 7,140,033 B1 * | 11/2006 | Durden | H04N 7/165 725/80 |
| 7,215,553 B2 * | 5/2007 | Neal | G06F 1/18 361/724 |
| 7,764,190 B2 * | 7/2010 | Mortensen | G08C 23/04 340/12.52 |
| 7,809,274 B2 * | 10/2010 | Wu | H04B 10/1141 398/130 |
| 7,932,811 B2 * | 4/2011 | Tanabe | G08C 23/04 340/5.64 |
| 8,295,707 B2 * | 10/2012 | Wu | H04B 10/1141 398/131 |
| 8,313,379 B2 * | 11/2012 | Ikeda | A63F 13/213 463/38 |
| 8,559,102 B2 * | 10/2013 | Tuchman | G08C 23/04 359/361 |
| 8,880,360 B2 * | 11/2014 | Mischel, Jr. | G02B 27/1073 702/44 |
| 8,909,055 B2 * | 12/2014 | Kawaida | G08C 23/04 398/106 |
| 9,081,426 B2 * | 7/2015 | Armstrong | G05G 9/04737 |
| 9,082,298 B2 * | 7/2015 | Chen | G08C 17/02 |
| RE45,905 E * | 3/2016 | Ikeda | A63F 13/24 |
| 9,357,303 B2 * | 5/2016 | Ogawa | G08C 23/04 |
| 9,432,125 B2 * | 8/2016 | Castano | G08C 23/04 |
| 9,435,926 B2 * | 9/2016 | Yamamoto | H04Q 9/00 |
| 9,438,339 B1 * | 9/2016 | Chan | H04B 10/1141 |
| 9,588,550 B2 * | 3/2017 | Smith | G06F 1/1601 |
| 9,632,227 B2 * | 4/2017 | Kawaida | G02B 6/4214 |
| 9,768,882 B2 * | 9/2017 | Castano | H04B 10/60 |
| 9,964,684 B2 * | 5/2018 | Nakamura | G02B 6/0051 |
| 10,088,623 B2 * | 10/2018 | Nakamura | G02B 6/0038 |
| 10,091,019 B2 * | 10/2018 | Arling | G08C 23/04 |
| 10,585,310 B2 * | 3/2020 | Ryu | G02B 6/0021 |
| 10,880,009 B2 * | 12/2020 | DiDonato | H04B 10/60 |
| 2001/0019367 A1 * | 9/2001 | Walton | H04N 7/17318 348/734 |
| 2002/0076178 A1 * | 6/2002 | Klocek | A61B 5/02007 385/106 |
| 2002/0158771 A1 * | 10/2002 | Mears | G08C 19/28 340/4.3 |
| 2002/0158772 A1 * | 10/2002 | Mears | G08C 19/28 340/4.31 |
| 2003/0189509 A1 * | 10/2003 | Hayes | G08C 17/02 341/176 |
| 2004/0075588 A1 * | 4/2004 | Wang | H01H 13/86 341/22 |
| 2004/0193647 A1 * | 9/2004 | Ueda | H04N 19/00 |
| 2006/0124851 A1 * | 6/2006 | Kajikuri | G01J 1/0407 250/338.1 |
| 2007/0206949 A1 * | 9/2007 | Mortensen | G08C 23/04 398/113 |
| 2007/0290885 A1 * | 12/2007 | Tanabe | G08C 23/04 340/13.24 |
| 2008/0291074 A1 * | 11/2008 | Tzeng | H04N 21/4113 341/176 |
| 2012/0206555 A1 * | 8/2012 | Yoshida | G06F 3/03545 348/14.02 |
| 2012/0293722 A1 * | 11/2012 | Kawai | H04B 10/1141 348/734 |
| 2013/0156435 A1 * | 6/2013 | Hsieh | G08C 23/04 398/106 |
| 2014/0105560 A1 * | 4/2014 | Kawaida | G02B 6/0011 385/146 |
| 2014/0166834 A1 * | 6/2014 | Kuroyanagi | F16M 13/02 248/231.91 |
| 2014/0340929 A1 * | 11/2014 | Nakamura | G02B 6/0045 362/601 |
| 2014/0376928 A1 * | 12/2014 | Castano | H04B 10/60 398/212 |
| 2015/0212248 A1 * | 7/2015 | Yamamoto | H04R 1/028 381/150 |
| 2016/0098922 A1 * | 4/2016 | Lee | G01J 1/0425 250/201.1 |
| 2016/0195428 A1 * | 7/2016 | McRae | G02F 1/1368 348/734 |
| 2020/0271846 A1 * | 8/2020 | Kurihara | G02B 6/0016 |
| 2021/0219016 A1 * | 7/2021 | Zanetti | H04N 21/43635 |

* cited by examiner

DISPLAY APPARATUS

BACKGROUND

1. Field

The present disclosure relates to a display apparatus.

2. Description of the Related Art

There are display apparatuses that are operated by receiving infrared signal light output from a remote controller (hereinafter also simply referred to as a "remote"). An example of such a display apparatus is a television set (hereinafter also simply referred to as a "TV"). A TV includes an infrared light receiving unit that receives infrared signal light from a remote.

For example, according to Japanese Unexamined Patent Application Publication No. 2014-68163 (Publication date: Apr. 17, 2014), a TV includes a frame that surrounds a display panel and further includes a protruding portion that protrudes downward from the lower hem of the frame. The infrared light receiving unit is incorporated into the protruding portion.

In recent years, multi-display apparatuses that provide a large screen have been developed. A multi-display apparatus is formed by arranging multiple display apparatuses. An image displayed on the multi-display apparatus is formed by combining images displayed by each of the display apparatuses that constitute the multi-display apparatus. A TV may be used as a display apparatus that constitutes a multi-display apparatus.

However, if the TV described in Japanese Unexamined Patent Application Publication No. 2014-68163 is used as a display apparatus that constitutes a multi-display apparatus, a gap (the space between the neighboring TVs) is formed in the screen due to the protruding portion that protrudes from the lower hem of the frame of each TV. For this reason, a single image formed on the multi-display apparatus is split into multiple images.

According to an aspect of the present disclosure, the gap between multiple display apparatuses that constitute a multi-display apparatus is minimized.

SUMMARY

According to an aspect of the present disclosure, a display apparatus includes a light receiving unit disposed so as not to protrude from a side surface of the display apparatus, where the light receiving unit receives infrared light output from a remote controller used to operate the display apparatus, and a light guide unit configured to guide the infrared light to the light receiving unit. The light guide unit is mounted on the side surface of the display apparatus in a demountable manner.

DESCRIPTION OF THE EMBODIMENTS

First Embodiment

Configuration of Display Apparatus

Figure 1:
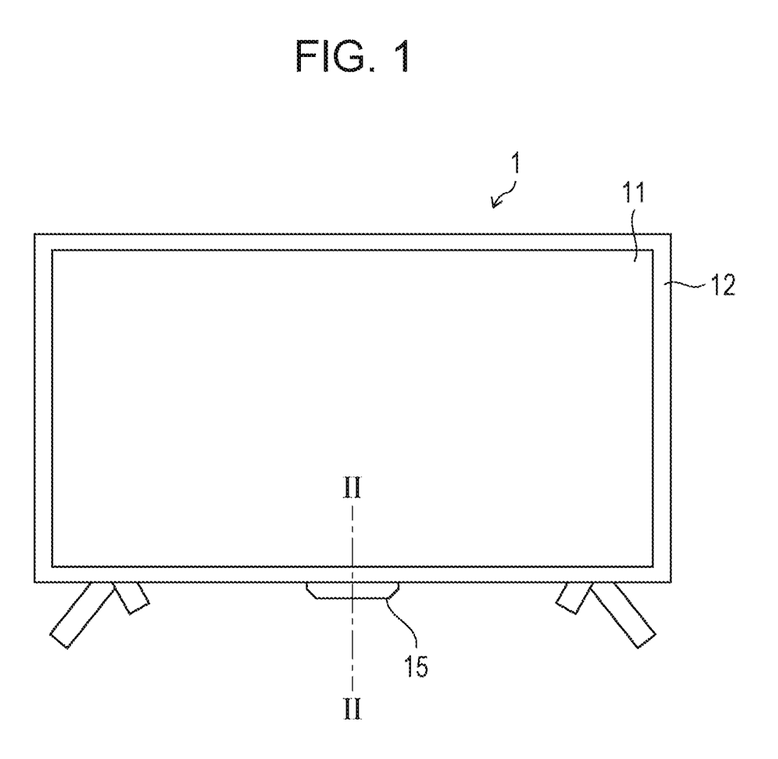
FIG. 1 is a front exterior view of a display apparatus according to a first embodiment of the present disclosure.
Figure 2:
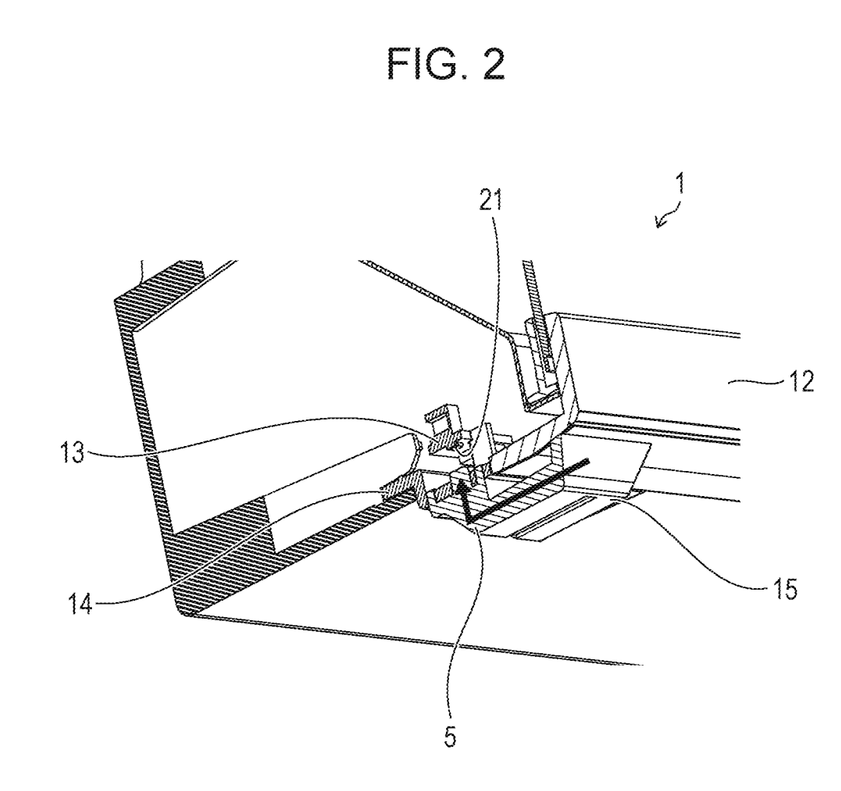
FIG. 2 is a cross-sectional view of the lower side surface of the display apparatus and its vicinity, taken along a line II-II of FIG. 1.

FIG. 1 is a front exterior view of a display apparatus 1 according to a first embodiment of the present disclosure. FIG. 2 is a cross-sectional view of the lower side surface of the display apparatus 1 and its vicinity, taken along a line II-II of FIG. 1. The display apparatus 1 is one that can be operated by infrared light output from a remote controller. According to the present embodiment, the display apparatus 1 is achieved in the form of a television set. However, the display apparatus 1 is not limited thereto, but can be achieved in the form of various types of display apparatuses, for example, a PC monitor. As illustrated in FIGS. 1 and 2, the display apparatus 1 includes a display panel 11, a bezel 12, a light receiving substrate 13, a holding portion 14, and a light guide unit 15.

The display panel 11 is a display unit that displays various types of information, such as video and text. The bezel 12 is disposed so as to surround all four sides of the display panel 11. That is, the bezel 12 corresponds to a frame region of the display apparatus 1. A display region of the display panel 11 is located inside the bezel 12. Therefore, the bezel 12 corresponds to a non-display region in the display apparatus 1.

The light receiving substrate 13 is disposed near the lower side surface of the display apparatus 1. The light receiving substrate 13 has a light receiving unit 21 mounted thereon. The light receiving unit 21 receives infrared light output from a remote controller. The lower side surface of the display apparatus 1 is one of the four side surfaces of the display apparatus 1 and corresponds to the bottom surface of the display apparatus 1. More specifically, the light receiving substrate 13 is disposed so as not to protrude from the lower side surface of the display apparatus 1. Since the light receiving unit 21 is mounted on the light receiving substrate 13, the light receiving unit 21 is also disposed so as not to protrude from the lower side surface of the display apparatus 1, just like the light receiving substrate 13. That is, the light receiving substrate 13 is disposed at a position such that it has no impact on the width of the bezel 12.

The holding portion 14 is disposed near the lower side surface of the display apparatus 1 to hold the light receiving substrate 13. The holding portion 14 is fixed to an external cabinet of the display apparatus 1 disposed behind the bezel 12. Since the light receiving substrate 13 is fixed to the holding portion 14, the light receiving substrate 13 is fixed to the external cabinet of the display apparatus 1. For this reason, it is difficult to easily remove the light receiving substrate 13 and the holding portion 14 from the display apparatus 1. The holding portion 14 is disposed so as not to protrude from the lower side surface of the display apparatus 1. That is, the holding portion 14 is disposed at a position such that it has no impact on the width of the bezel 12.

The light guide unit 15 guides, to the light receiving unit 21, infrared light 5 that is output from the remote controller and that is incident on the light guide unit 15. The light guide unit 15 is mounted on the lower side surface of the display apparatus 1 in a demountable manner. That is, the light guide unit 15 has a protruding structure that protrudes from the lower side surface of the display apparatus 1 toward the outside of the display apparatus 1. To maximize the light receiving range of the light guide unit 15 that receives infrared light output from the remote controller, the front surface of the light guide unit 15 is located near the front surface of the display apparatus 1.

Figure 3:
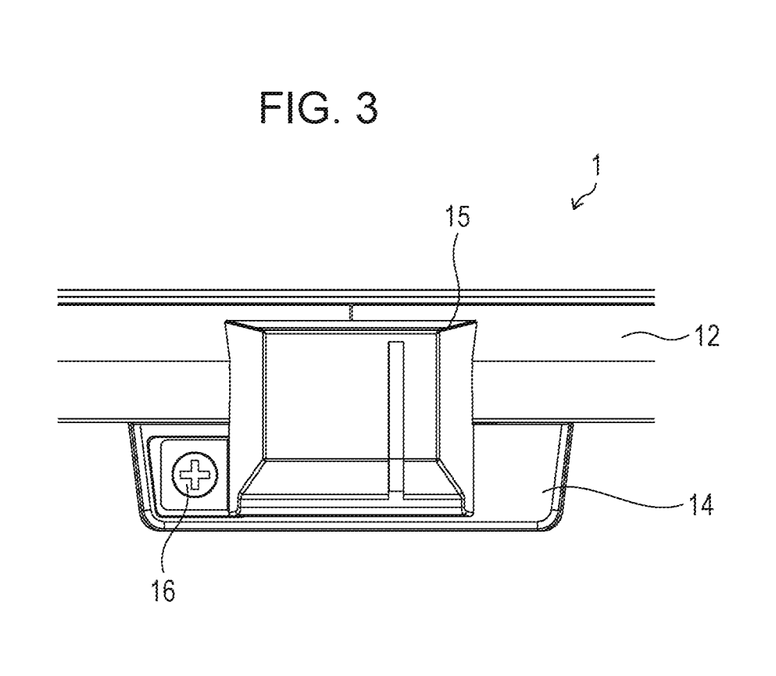
FIG. 3 illustrates the lower side surface of the display apparatus.

FIG. 3 illustrates the lower side surface of the display apparatus 1. As illustrated in FIG. 3, the light guide unit 15 is disposed on the lower side surface of the display apparatus 1 so as to overlap the bezel 12 and the holding portion 14. In addition, the light guide unit 15 is fixed to the holding portion 14 by using a screw 16 in a demountable manner from the display apparatus 1.

Figure 4:
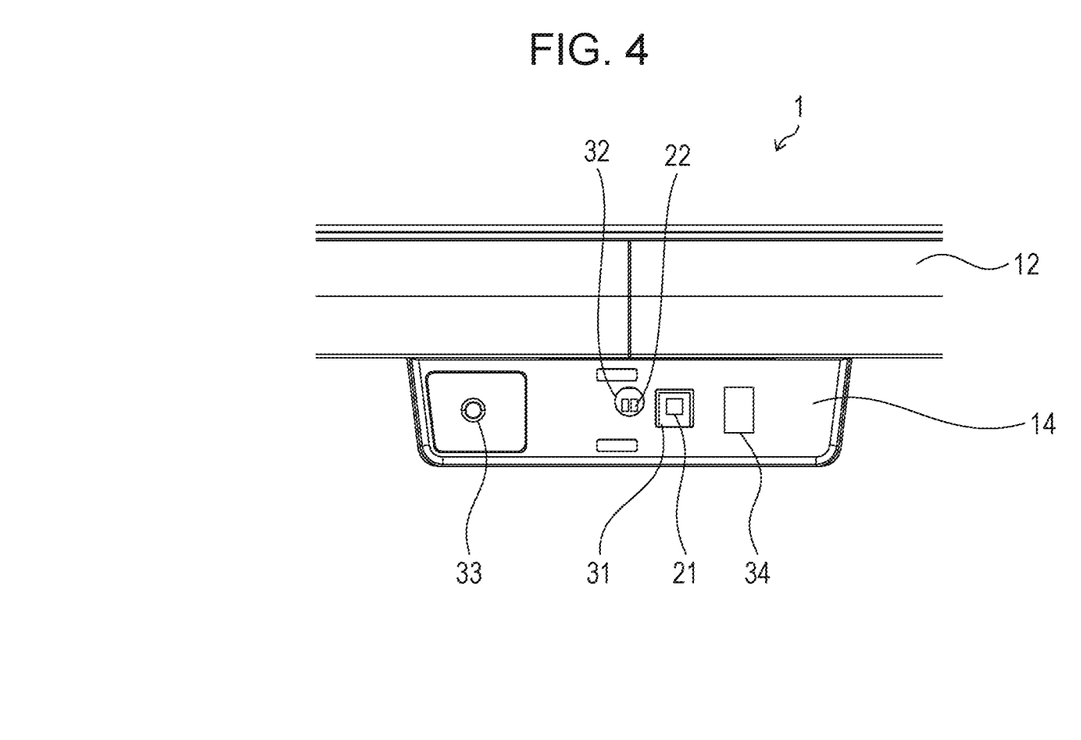
FIG. 4 illustrates the lower side surface of the display apparatus with a light guide unit dismounted.

As illustrated in FIG. 2, the light receiving direction of the light receiving unit 21 is oriented toward the lower side surface of the display apparatus 1. As illustrated in FIG. 4, a through-hole 31 (an opening) is provided in the holding portion 14 at a position facing the light receiving unit 21. The light guide unit 15 faces the light receiving unit 21 through the through-hole 31.

FIG. 4 illustrates the lower side surface of the display apparatus 1 with the light guide unit 15 dismounted. In FIG. 4, since the light guide unit 15 is dismounted from the display apparatus 1, a portion of the holding portion 14 that overlaps the light guide unit 15 is exposed. As illustrated in FIG. 4, the holding portion 14 has the through-hole 31, a through-hole 32, a screw hole 33, and a through-hole 34. In addition to having the above-described light receiving unit 21 mounted thereon, the light receiving substrate 13 has an LED element 22. The LED element 22 lights up in a color representing the operation mode of the display apparatus 1 (one of an active mode and a standby mode). In the example illustrated in FIG. 4, the LED element 22 is composed of two elements that emit different colors. When the display apparatus 1 is in an active mode, the first element lights up in a first color (e.g., green) and the second element turns off to let the user know that the display apparatus 1 is in an active mode. When the display apparatus 1 is in a standby mode, the second element lights up in a second color (e.g., red) and the first element turns off to let the user know that the display apparatus 1 is in a standby mode. The through-hole 32 is provided in the holding portion 14 at a position that overlaps the LED element 22. The light output from the LED element 22 is incident on the light guide unit 15 through the through-hole 32 and is finally emitted from the front surface of the light guide unit 15 to the outside of the display apparatus 1. That is, when the LED element 22 lights up, part of the light guide unit 15 emits light. By seeing the light emitted from the light guide unit 15, the user gets to know whether the display apparatus 1 is in an active mode or a standby mode.

To mount the light guide unit 15 on the lower side surface of the display apparatus 1, a hook portion (not illustrated) located on one side of the light guide unit 15 is inserted into the through-hole 34 of the holding portion 14 and is hooked to the holding portion 14. In addition, the screw 16 is screwed into the screw hole 33 so that the light guide unit 15 is fixed to the holding portion 14. The light guide unit 15 fixed in this manner can be easily dismounted from the lower side surface of the display apparatus 1 by removing the screws 16 using a Phillips screwdriver. That is, the light guide unit 15 is fixed to the lower side surface of the display apparatus 1 in a demountable manner by using the screw 16.

Figure 5:
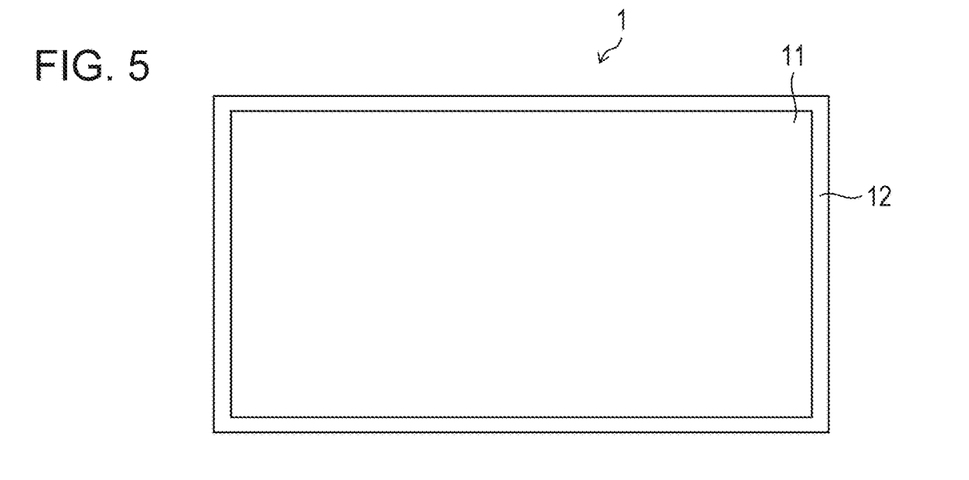
FIG. 5 is a front view of the display apparatus with the light guide unit dismounted.

FIG. 5 is a front view of the display apparatus 1 with the light guide unit 15 dismounted. In FIG. 5, the light guide unit 15 is dismounted from the lower side surface of the display apparatus 1. Therefore, there is no protruding structure on each of the four side surfaces (including the lower side surface) of the display apparatus 1.

Figure 6:
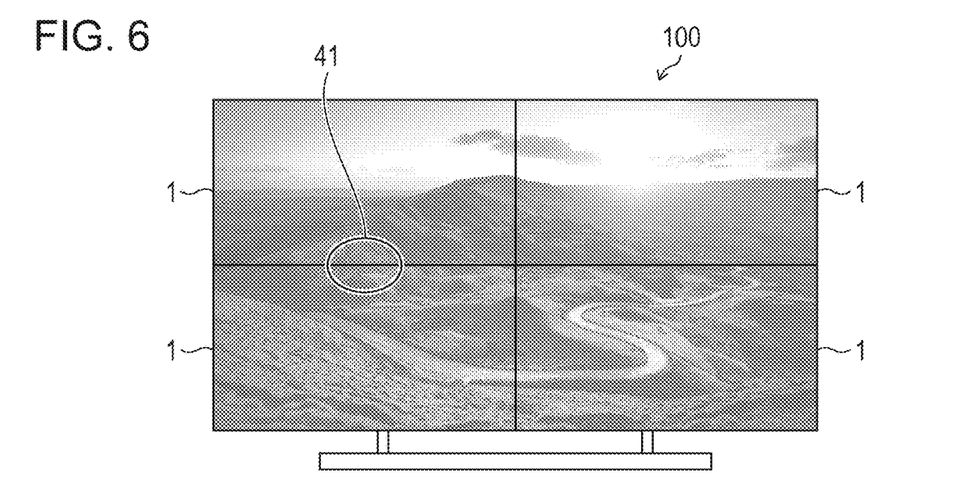
FIG. 6 is a front view of a multi-display apparatus composed of four display apparatuses.

FIG. 6 is a front view of a multi-display apparatus 100 composed of four display apparatuses 1. By, as illustrated in FIG. 5, arranging a plurality of display apparatuses 1 each with the light guide unit 15 dismounted, a multi-display apparatus 100 can be achieved that has a huge display screen formed by combining the display screens of the display apparatuses 1. In FIG. 6, four display apparatuses 1, each with the light guide unit 15 dismounted, are arranged in a two-by-two arrangement and are connected to one another to achieve a single multi-display apparatus 100. The achieved multi-display apparatus 100 is capable of displaying a desired image on one huge display screen consisting of the display screens of the display apparatuses 1. The light receiving unit 21 provided in the left display apparatus 1 is disposed in the vicinity 41 of the middle point of the boundary line between the upper left display apparatus 1 and the lower left display apparatus 1. The light receiving unit 21 is in a mode in which it can receive infrared light. For this reason, if the user points the remote controller at the vicinity 41 and performs an input operation on the remote controller to control the display apparatus 1 (e.g., an operation to press a button), the user can normally operate the display apparatus 1 that constitutes the multi-display apparatus 100.

Operation and Effect

Since the display apparatus 1 includes the light receiving substrate 13 and the holding portion 14, the light guide unit 15 can be dismounted from the display apparatus 1 without generating a protruding structure on the lower side surface of the display apparatus 1 while keeping the light receiving unit 21 at a desired position in the display apparatus 1. Furthermore, since the light receiving substrate 13 and the holding portion 14 are disposed at a position such that they have no impact on the width of the bezel 12, the bezel 12 can have a narrow frame structure without being restricted by the light receiving substrate 13 and the holding portion 14. As a result, when the multi-display apparatus 100 is configured, the bezel 12 can have a structure that does not interfere with the display screen.

Since the light guide unit 15 can be dismounted from the lower side surface of the display apparatus 1, a side surface of a display apparatus 1 can be brought as close as possible to a side surface of a neighboring display apparatus 1 when the multi-display apparatus 100 is configured. This allows the gap between the neighboring display apparatuses 1 in the configured multi-display apparatus 100 to be minimized. In this manner, high-quality large screen images can be displayed on the multi-display apparatus 100.

In terms of the mode of the display apparatus 1, one of two modes can be selected: a mode in which the infrared light receiving performance of the light receiving unit 21 is fully satisfied by mounting the light guide unit 15 and a mode in which the display apparatus 1 has a narrow frame structure without a protruding structure by removing the light guide unit 15. One end of the light guide unit 15 turns its front toward the light receiving unit 21, and the other end turns its front in the frontal direction of the display apparatus 1. For this reason, when the light guide unit 15 is mounted on the display apparatus 1, infrared light can be led from the vicinity of the front of the frame (the bezel 12) of the display apparatus 1. This structure provides a satisfactory light receiving sensitivity for the infrared light output from the remote controller. In addition, even when the light guide unit 15 is dismounted, the light receiving substrate 13 remains held by the holding portion 14, allowing the user to fully operate the display apparatus 1 by using the remote controller at a short distance.

To block the user's finger from entering the display apparatus 1, the through-holes 31 and 32 are formed as holes of the bare minimum size. This allows the structure of the multi-display apparatus 100 to have a usable strength even when the light guide unit 15 is dismounted.

The direction in which the light receiving substrate 13 extends is parallel to the direction in which the lower side surface of the display apparatus 1 extends. As a result, an elongated light receiving substrate 13 can be employed in the display apparatus 1 that still has a narrow frame.

Since a part used to fix the light guide unit 15 is the screw 16, the light guide unit 15 can be easily mounted or dismounted by simply screwing or unscrewing the screw 16.

Since a television set can be used as the display apparatus 1, a television set can be achieved that can configure a multi-display apparatus in which a gap between neighboring display apparatuses 1 is minimized.

Modification of Fixing Technique

The screw 16 is only an example of a fixing part that fixes the light guide unit 15 to the display apparatus 1 in a demountable manner. The display apparatus 1 may be provided with another fixing part that fixes the light guide unit 15 to the display apparatus 1 in a demountable manner by using a mechanism different from that of the screw 16. An example of such a fixing part is illustrated in FIG. 7.

Figure 7:
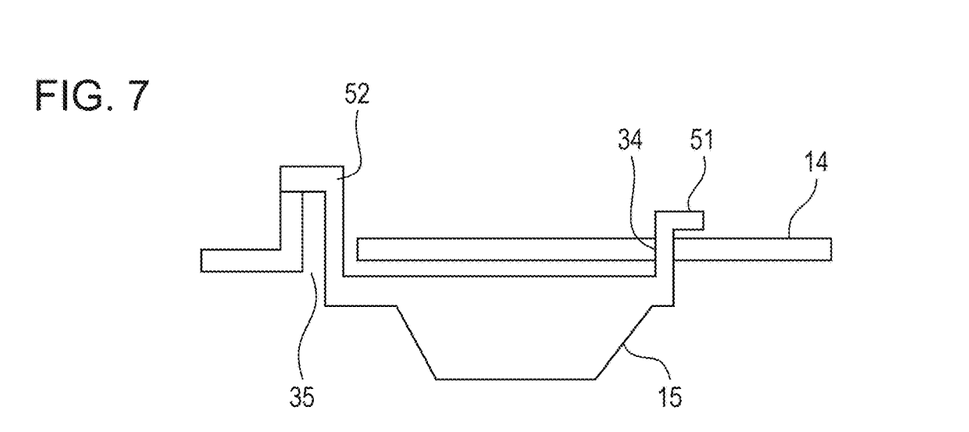
FIG. 7 illustrates a light guide unit that can be fixed to a display apparatus by hooking one side of the light guide unit on the display apparatus.

FIG. 7 illustrates a light guide unit 15 that can be fixed to a display apparatus 1 by hooking one side of the light guide unit 15 on the display apparatus 1. In this example, the light guide unit 15 has a hooking portion 51 at one end thereof and a hooking portion 52 at the other end. To fix the light guide unit 15 to the display apparatus 1, the hooking portion 51 is inserted into the through-hole 34 of the holding portion 14 and is hooked to the holding portion 14 first. Subsequently, the hooking portion 52 is inserted into a gap 35 between the holding portion 14 and the bezel 12 and is hooked to the bezel 12. This allows the light guide unit 15 to be fixed to the display apparatus 1 in a demountable manner without using the screw 16. To demount the light guide unit 15 from the display apparatus 1, a flat-blade screwdriver, for example, is inserted into the gap 35 to unhook the hooking portion 52 from the bezel 12.

In the example illustrated in FIG. 7, a protruding portion that can be hooked by the user's fingernail may be further provided as part of the hook portion 52. In this example, since the light guide unit 15 can be dismounted from the display apparatus 1 by using the user's fingernail, the user can dismount the light guide unit 15 without using even a flathead screwdriver. That is, the light guide unit 15 can be dismounted from the display apparatus 1 more quickly.

The light guide unit 15 can be fixed to the display apparatus 1 in a demountable manner by using a technique different from the fixing technique using the screw 16 or the hooking portion 52. Examples of such a technique include a sliding technique, a rotating and sliding technique, and a technique to directly screwing the light guide unit 15 itself.

Modification of Configuration of Multi-Display Apparatus

Figure 8:
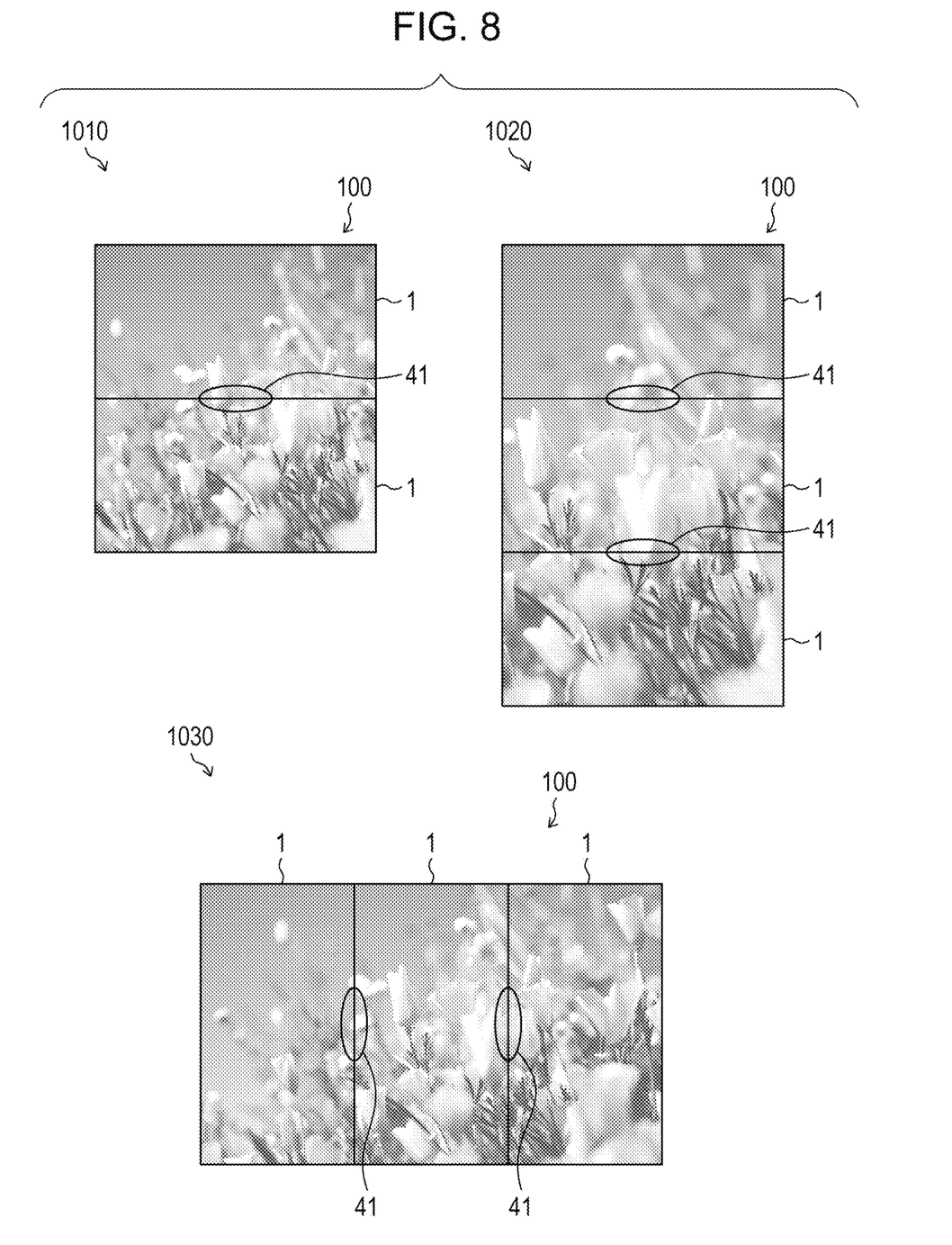
FIG. 8 illustrates another configuration example of a multi-display apparatus.

FIG. 8 illustrates another configuration example of a multi-display apparatus 100. The configuration of the multi-display apparatus 100 is not limited to the configuration illustrated in FIG. 6, in which four display apparatuses 1 are arranged in a two-by-two arrangement, but may be a configuration in which two or three display apparatuses 1 are arranged in a line as illustrated in FIG. 8.

In an example 1010 illustrated in FIG. 8, the multi-display apparatus 100 is composed of two landscape-oriented display apparatuses 1 arranged in the vertical direction. That is, the two display apparatuses 1 are arranged in a one-by-two arrangement (in a vertical two-tiered arrangement). The light guide unit 15 is dismounted from the lower side surface of each of the display apparatuses 1. In this manner, the multi-display apparatus 100 composed of two display apparatuses 1 can be achieved with a minimum gap between the upper and lower display apparatuses 1. The light receiving unit 21 provided in the upper display apparatus 1 is disposed in the vicinity 41 of the middle point of the boundary line between the upper and lower display apparatuses 1. The light receiving unit 21 is in a mode in which it can receive infrared light. As a result, if the user performs an input operation on the remote controller to control the display apparatus 1 (e.g., an operation to press a button) while the remote controller is pointed at the vicinity 41, the user can normally operate the display apparatus 1 that constitutes the multi-display apparatus 100.

In an example 1020 illustrated in FIG. 8, the multi-display apparatus 100 is composed of three landscape-oriented display apparatuses 1 arranged in the vertical direction. That is, the three display apparatuses 1 are arranged in a one-by-three arrangement (in a vertical three-tiered arrangement). The light guide unit 15 is dismounted from the lower side surface of each of the display apparatuses 1. In this manner, the multi-display apparatus 100 composed of three display apparatuses 1 can be achieved with a minimum gap between every upper and lower display apparatuses 1. The light receiving unit 21 provided in the uppermost display apparatus 1 is disposed in the vicinity 41 of the middle point of the boundary line between the uppermost display apparatus 1 and the middle display apparatus 1. The light receiving unit 21 is in a mode in which it can receive infrared light. In addition, the light receiving unit 21 provided in the middle display apparatus 1 is disposed in the vicinity 41 of the middle point of the boundary line between the middle display apparatus 1 and the lowermost display apparatus 1. The light receiving unit 21 is in a mode in which it can receive infrared light. For this reason, if the user performs an input operation on the remote controller to control the display apparatus 1 (e.g., an operation to press a button) while the remote controller is pointed at either one of the vicinities 41, the user can normally operate the display apparatus 1 that constitutes the multi-display apparatus 100.

In an example 1030 illustrated in FIG. 8, the multi-display apparatus 100 is composed of three portrait-oriented display apparatuses 1 arranged in the horizontal direction. That is, the three display apparatuses 1 are arranged in a three-by-one arrangement (in a horizontal three-tiered arrangement). The light guide unit 15 is dismounted from the lower side surface of each of the display apparatuses 1 (corresponding to the right side surface of a portrait-oriented display apparatus). In this manner, the multi-display apparatus 100 composed of three display apparatuses 1 can be achieved with a minimum gap between every right and left display apparatuses 1. The light receiving unit 21 provided in the leftmost display apparatus 1 is disposed in the vicinity 41 of the middle point of the boundary line between the leftmost display apparatus 1 and the middle display apparatus 1. The light receiving unit 21 is in a mode in which it can receive infrared light. In addition, the light receiving unit 21 provided in the middle display apparatus 1 is disposed in the vicinity 41 of the middle point of the boundary line between the middle display apparatus 1 and the rightmost display apparatus 1. The light receiving unit 21 is in a mode in which it can receive infrared light. For this reason, if the user performs an input operation on the remote controller to control the display apparatus 1 (e.g., an operation to press a button) while the remote controller is pointed at either one of the vicinities 41, the user can normally operate the display apparatus 1 that constitutes the multi-display apparatus 100.

Other Modifications

The holding portion 14 may be a part of the bezel 12. In this case, the light receiving substrate 13 is fixed to the bezel 12. In addition, the light guide unit 15 is fixed to the bezel 12 by using the screw 16. Even in this example, the light guide unit 15 can still be mounted to the lower side surface of the display apparatus 1 in a demountable manner.

The locations at which the light receiving substrate 13, the holding portion 14, and the light guide unit 15 are disposed are not limited to the vicinity of the lower side surface of the display apparatus 1, but may be other locations in accordance with various conditions, such as the design of the display apparatus 1. For example, the light guide unit 15 may be mounted on a side surface of the display apparatus 1 other than the lower side surface. That is, the light guide unit 15 may be mounted on any one of the upper side surface, left side surface, and right side surface of the display apparatus 1. In this example, the light receiving substrate 13 and the holding portion 14 are disposed in the vicinity of the side surface on which the light guide unit 15 is mounted such that they do not protrude from the side. To mount the light guide unit 15 on a side surface other than the lower side surface, it is desirable that a technique of fixing the light guide unit 15 without using the screw 16 be employed, because the technique minimizes the impact on the appearance of the display apparatus 1.

Second Embodiment

Figure 9:
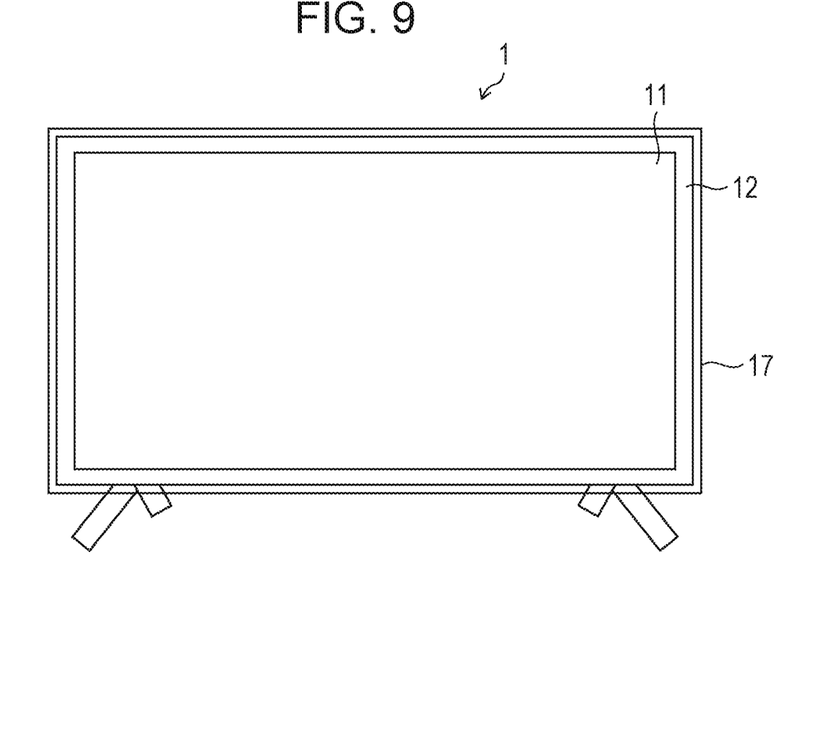
FIG. 9 is a front exterior view of a display apparatus with a touch panel (an overlay) according to a second embodiment of the present disclosure.

FIG. 9 is a front view of the exterior appearance of the display apparatus 1 with a touch panel 17 (an overlay) according to the second embodiment of the present disclosure. In this example, the light guide unit 15 is dismounted from the display apparatus 1. Furthermore, the display apparatus 1 has an external touch panel 17, with the light guide unit 15 dismounted. As illustrated in FIG. 9, if the light guide unit 15 outside the bezel 12 is dismounted, there is no protruding portion on the side surface of the display apparatus 1. Accordingly, the touch panel 17 can be added on to the display apparatus 1. As a result, the display apparatus 1 can be used not only for watching TV programs in the home, but also for B2B (Business to Business) applications, such as presentations using the touch panel 17.

Third Embodiment

Figure 10:
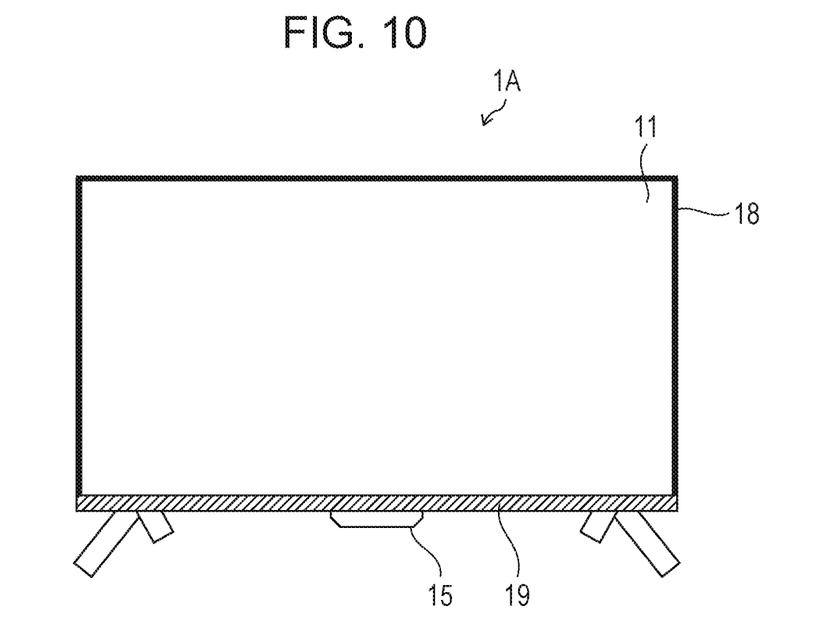
FIG. 10 is a front exterior view of a display apparatus according to a third embodiment of the present disclosure.

FIG. 10 is a front exterior view of a display apparatus 1A according to the third embodiment of the present disclosure. Like the display apparatus 1 according to first embodiment, the display apparatus 1A includes a display panel 11 and a light guide unit 15. However, unlike the display apparatus 1 according to first embodiment, the display apparatus 1A has a structure known as a bezel-less structure. More specifically, the display apparatus 1 does not have the bezel 12, but instead has a frame 18 that covers the upper side surface, left side surface, and right side surface of the display apparatus 1. The frame 18 does not cover the front (the front surface) of the display apparatus 1A. Interconnection lines for connecting internal components, such as the display panel 11, with one another are formed on the lower side surface of the display apparatus 1A. The display apparatus 1A further includes a cover portion 19 that is bonded to cover the interconnection lines. Because a region where the cover 19 is bonded is located at the rim of the lower side surface of the display apparatus 1A, the region corresponds to part of the frame of the display apparatus 1A, like the bezel 12. In addition, because like the bezel 12, a screen image is not displayed in the region where the cover portion 19 is bonded, the region corresponds to a non-display region of the display apparatus 1A, like the bezel 12.

In the example illustrated in FIG. 10, the light guide unit 15 is mounted on the lower side surface of the display apparatus 1A where the frame 18 is not disposed. The mounting technique is the same as in the first embodiment. That is, the light guide unit 15 is fixed to the holding portion 14 in a removable manner from the display apparatus 1A by using the screw 16. Therefore, even in a display apparatus 1A with a bezel-less structure as illustrated in FIG. 10, the light guide unit 15 can be dismounted so that the display apparatus 1A does not have a protruding structure on the lower side. As a result, as in first embodiment, a multi-display apparatus with a minimum gap between the display apparatuses 1A can be achieved by using a plurality of display apparatuses 1A each with the light guide unit 15 dismounted.

CONCLUSION

According to a first aspect of the present disclosure, a display apparatus includes a light receiving unit disposed so as not to protrude from a side surface of the display apparatus, where the light receiving unit receives infrared light output from a remote controller used to operate the display apparatus, and a light guide unit configured to guide the infrared light to the light receiving unit. The light guide unit is mounted on the side surface of the display apparatus in a demountable manner.

According to the above configuration, a user can dismount the light guide unit from the side surface of the display apparatus. For this reason, a side surface of a display apparatus can be brought as close as possible to a side surface of a neighboring display apparatus when a multi-display apparatus is configured. This structure can minimize a gap between the neighboring display apparatuses in the configured multi-display apparatus.

According to a second aspect of the present disclosure, the display apparatus may include a light receiving substrate having the light receiving unit mounted thereon, where the light receiving substrate is disposed so as not to protrude from the side surface, and a holding portion configured to hold the light receiving substrate. The holding portion may be disposed so as not to protrude from the side surface.

According to the above configuration, the light guide unit can be dismounted without generating a protruding structure on a side surface of the display apparatus while keeping the light receiving unit at a desired position.

According to a third aspect of the present disclosure, in the display apparatus according to the second aspect of the present disclosure, a light receiving direction of the light receiving unit may be oriented toward the side surface. An opening may be formed in the holding portion at a position facing the light receiving unit, and the light guide unit may face the light receiving unit through the opening.

According to the above configuration, since the light receiving direction of the light receiving unit is oriented toward the outside of the display apparatus through the opening of the holding portion when the light guide unit is dismounted, infrared light can reach the light receiving unit through the opening. As a result, if infrared light is emitted from a remote to the vicinity of the light receiving unit of the display apparatus whose light receiving unit has been dismounted among the plurality of display apparatuses, the display apparatus can receive the infrared light.

This allows the infrared light receiving function of the multi-display apparatus to be maintained to a certain degree.

According to a fourth aspect of the present disclosure, the display apparatus according to any one of the first to third aspects described above may further include a fixing part configured to fix the light guide unit to the display apparatus in a demountable manner.

According to the above configuration, the light guide unit can be easily mounted and dismounted by operating the fixing part.

According to a fifth aspect of the present disclosure, in the display apparatus according to the fourth aspect described above, the fixing part may be a screw.

According to the above configuration, the light guide unit can be easily mounted and dismounted by simply screwing or unscrewing the screw.

According to a sixth aspect of the present disclosure, in the display apparatus according to the second or third aspect described above, a direction in which the light receiving substrate extends may be parallel to a direction in which the side surface extends.

According to the above configuration, an elongated light receiving substrate can be employed in the display apparatus that still has a narrow frame.

According to a seventh aspect of the present disclosure, the display apparatus according to any one of the first to sixth aspects described above may be a television set.

According to the above configuration, a television set that can configure a multi-display apparatus with a minimum gap can be achieved.

APPENDIX

The present disclosure is not limited to each of the embodiments described above, but various changes can be made within the scope of the claims. In addition, embodiments obtained by combining technical units disclosed in different embodiments as appropriate are also encompassed in the technical scope of the present disclosure. Furthermore, new technical features can be formed by combining the technical units disclosed in the embodiments.

The present disclosure contains subject matter related to that disclosed in Japanese Priority Patent Application JP 2020-117984 filed in the Japan Patent Office on Jul. 8, 2020, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a light receiving unit disposed so as not to protrude from a side surface of the display apparatus, the light receiving unit receiving infrared light output from a remote controller used to operate the display apparatus; and
a light guide unit configured to guide the infrared light to the light receiving unit,
wherein the light guide unit is mounted on the side surface of the display apparatus in a demountable manner, and
the light guide unit has a protruding structure that protrudes from the side surface of the display apparatus toward the outside of the display apparatus.

2. The display apparatus according to claim 1, further comprising:
a light receiving substrate having the light receiving unit mounted thereon, the light receiving substrate being disposed so as not to protrude from the side surface; and
a holding portion configured to hold the light receiving substrate,
wherein the holding portion is disposed so as not to protrude from the side surface.

3. The display apparatus according to claim 2, wherein a light receiving direction of the light receiving unit is oriented toward the side surface,
wherein an opening is formed in the holding portion at a position facing the light receiving unit, and
wherein the light guide unit faces the light receiving unit through the opening.

4. The display apparatus according to claim 1, further comprising:
a fixing part configured to fix the light guide unit to the display apparatus in a demountable manner.

5. The display apparatus according to claim 4, wherein the fixing part is a screw.

6. The display apparatus according to claim 2, wherein a direction in which the light receiving substrate extends is parallel to a direction in which the side surface extends.

7. The display apparatus according to claim 1, wherein the display apparatus is a television set.

8. The display apparatus according to claim 3, wherein the light guide unit has a first hooking portion at one end thereof and a second hooking portion at the other end,
the first hooking portion is inserted into the opening and is hooked to the holding portion, and
the second hooking portion is inserted into a gap between the holding portion and a bezel of the display apparatus and is hooked to the bezel.

* * * * *